United States Patent
Sekine et al.

[11] Patent Number: 6,092,816
[45] Date of Patent: Jul. 25, 2000

[54] VEHICLE HEIGHT ADJUSTING APPARATUS AND CYLINDER SYSTEM USED THEREFOR

[75] Inventors: Chigaya Sekine; Tetuo Katoh; Kenichi Nakamura, all of Kanagawa-ken, Japan

[73] Assignee: Tokico Ltd, Kanagawa-ken, Japan

[21] Appl. No.: 09/058,409

[22] Filed: Apr. 10, 1998

[30] Foreign Application Priority Data

Apr. 11, 1997 [JP] Japan ..................... 9-110341
Mar. 31, 1998 [JP] Japan ................... 10-103538

[51] Int. Cl.[7] ............................................. B60G 17/044
[52] U.S. Cl. ................................. 280/6.159; 280/5.514; 267/64.17
[58] Field of Search .................. 280/6.157, 6.15, 280/6.159, 5.514, 5.5, 5.515, FOR 171, 124.159; 267/64.17, 64.16; 188/282.22, 266.2

[56] References Cited

U.S. PATENT DOCUMENTS

| | | | |
|---|---|---|---|
| 3,558,153 | 1/1971 | Strauff | 267/64.16 |
| 3,689,103 | 9/1972 | Meulendyk | 267/64.16 |
| 5,338,010 | 8/1994 | Haupt | 267/64.16 |
| 5,348,338 | 9/1994 | Kuriki et al. | 280/124.159 |
| 5,351,790 | 10/1994 | Machida | 188/314 |
| 5,586,781 | 12/1996 | Anderson | 280/124.159 |
| 5,797,594 | 8/1998 | Sekine et al. | 267/64.17 |
| 5,941,508 | 8/1999 | Murata et al. | 267/64.17 |

FOREIGN PATENT DOCUMENTS 3728-694  3/1989  Germany ............... 280/FOR 171

*Primary Examiner*—Paul N. Dickson
*Assistant Examiner*—Lynda Jasmin
*Attorney, Agent, or Firm*—Wenderoth, Lind & Ponack, L.L.P.

[57] ABSTRACT

A cylinder 3 is fitted with a piston 5. A pump rod 12 is fitted into a pump tube 11 in a piston rod 6 to form a pump chamber 13. An oil tank 17 is connected to the pump chamber 13 by a line 16 through a switching valve mechanism 18. An accumulator tank 20 is connected to the cylinder 3 by a line 19 through a switching valve 21. Normally, the switching valve 21 is closed, and a switching valve 26 is set to a position (a) in which the fluid flows to the pump chamber through a check value 27. By using the pump chamber 13 and check valves 23 and 27, a hydraulic fluid is supplied from the oil tank 17 to the accumulator tank 20 by the extension and contraction of the piston rod 6, thereby accumulating the pressurized hydraulic fluid in the accumulator tank 20. By opening the switching valve 21, the cylinder 3 is pressurized to raise the vehicle height. By switching the switching valve 26 to a position (b) in which the pump chamber 13 is connected with the oil tank bidirectionally, the pressure in the cylinder 3 is reduced through an orifice port 15 to lower the vehicle height.

10 Claims, 5 Drawing Sheets

VEHICLE HEIGHT ADJUSTING APPARATUS AND CYLINDER SYSTEM USED THEREFOR

BACKGROUND OF INVENTION

The present invention relates to a cylinder system installed in a suspension system of a vehicle, for example, an automobile. The present invention also relates to a vehicle height adjusting apparatus using such a cylinder system.

Generally, in automobiles or other vehicles, a hydraulic damper (cylinder system) is installed between a sprung member and an unsprung member of a suspension system to damp vibrations of the suspension spring, thereby improving the ride quality and the steering stability.

In vehicles having a relatively large load-carrying capacity, e.g. vans or station wagons, the vehicle height may vary to a considerable extent with a change in the carrying load due to the fact that the occupant gets on or off the vehicle, or goods or baggage is loaded onto or unloaded from the vehicle. This causes the ride quality and the steering stability to be degraded. Therefore, there has been a demand for a suspension system capable of automatically maintaining a constant vehicle height irrespective of variations in the carrying load.

Under these circumstances, there has heretofore been proposed a self-pumping hydraulic damper as disclosed, for example, in Japanese Patent Application Unexamined Publication (KOKAI) No. 60-261713. In the conventional hydraulic damper, an oil tank and a reservoir have a high-pressure gas sealed therein. A pump device supplies a hydraulic fluid from the oil tank into a cylinder in response to the extension and contraction of a piston rod. A relief device relieves the pressure fluid in the pump device and the cylinder to the oil tank according to the position of the piston rod. The pressure in the cylinder is appropriately adjusted by operating the pump device and the relief device using vibrations of the suspension system during running of the vehicle so that the length to which the piston rod extends is adjusted to a constant value, thereby automatically maintaining a constant vehicle height.

However, the conventional self-pumping hydraulic damper suffers from some problems. After a vehicle equipped with the self-pumping hydraulic damper has run with no baggage loaded thereon, the pressure of the hydraulic fluid in the cylinder has been adjusted to a low level according to the small carrying load. If the vehicle under these conditions is loaded with baggage, the vehicle height lowers by an amount corresponding to an increase in the carrying load. As the vehicle loaded with the baggage runs, the pump device operates to supply the pressure fluid from the oil tank into the cylinder, causing the vehicle height to rise gradually. In this way, the vehicle height is adjusted to a predetermined level. In this case, when starting running where pumping has not yet sufficiently been effected, the vehicle runs in a state where the vehicle height is still low. Accordingly, the road clearance is insufficient, and the suspension system is likely to touch the ground. Therefore, when the carrying load is heavy or when the vehicle passes an uneven spot on the road, the suspension system may touch the ground unfavorably.

BRIEF SUMMARY OF THE INVENTION

In view of the above-described circumstances, an object of the present invention is to provide a cylinder system and a vehicle height adjusting apparatus which enable a sufficient vehicle height to be ensured even immediately after the vehicle in unloaded condition has been loaded with baggage.

The present invention provides a cylinder system including a cylinder having a hydraulic fluid sealed therein. A piston is slidably fitted in the cylinder. A piston rod is connected at one end thereof to the piston. The other end of the piston rod extends to the outside of the cylinder. The cylinder system further includes an oil tank for storing the hydraulic fluid and an accumulator tank for accumulating the pressurized hydraulic fluid. A pump device supplies the hydraulic fluid from the oil tank to the accumulator tank in response to strokes of the piston rod. A first passage connects the cylinder and the accumulator tank. A first switching valve selectively opens and closes the first passage. A second passage connects the cylinder and the oil tank. A second switching valve selectively opens and closes the second passage.

By virtue of the above-described arrangement, the pump device operates in response to the strokes of the piston rod caused by vibrations of the vehicle during running to supply the hydraulic fluid from the oil tank to the accumulator tank, thereby accumulating the pressurized hydraulic fluid in the accumulator tank. Further, the hydraulic fluid in the accumulator tank is supplied to the cylinder by opening the first switching valve, and the hydraulic fluid in the cylinder is returned to the oil tank by opening the second switching valve, thereby adjusting the pressure of the hydraulic fluid in the cylinder.

In addition, the present invention provides a vehicle height adjusting apparatus including the above-described cylinder system and a vehicle height detecting device for detecting the vehicle height. The cylinder system and the vehicle height detecting device are provided between a vehicle body and an axle. When the vehicle height detected by the vehicle height detecting device is within a predetermined standard vehicle height range, the first switching valve and the second switching valve are closed. When the vehicle height is lower than the standard vehicle height range, the first switching valve is opened and the second switching valve is closed to raise the vehicle height. When the vehicle height is higher than the standard vehicle height range, the first switching valve is closed and the second switching valve is opened to lower the vehicle height.

By virtue of the above-described arrangement, when the vehicle height is within the standard vehicle height range, the first and second switching valves are closed to cut off the cylinder from the oil tank and the accumulator tank. When the vehicle height is lower than the standard vehicle height, the first switching valve is opened to supply the hydraulic fluid from the accumulator tank to the cylinder, thereby raising the vehicle height. When the vehicle height is higher than the standard vehicle height, the second switching valve is opened to discharge the hydraulic fluid from the cylinder to the oil tank, thereby lowering the vehicle height. Thus, the vehicle height is adjusted within a standard vehicle height range.

In addition, the present invention provides a cylinder system including a cylinder having a hydraulic fluid sealed therein. A piston is slidably fitted in the cylinder. A piston rod is connected at one end thereof to the piston. The other end of the piston rod extends to the outside of the cylinder. The cylinder system further includes an oil tank for storing the hydraulic fluid, an accumulator tank for accumulating the pressurized hydraulic fluid, and a pump chamber whose volumetric capacity varies according to the stroke of the piston rod. A first passage connects the pump chamber and the oil tank. A second passage connects the pump chamber and the accumulator tank. Third and fourth passages provide communication between the pump chamber and the cylinder. A first check valve allows the hydraulic fluid to flow through the third passage in only one direction from the pump chamber to the cylinder. A first valve device cuts off the third passage when the stroke of the piston rod is not shorter than a standard range. When the stroke of the piston rod is shorter than the standard range, the first valve device allows communication through the third passage. A second valve device cuts off the fourth passage when the stroke of the piston rod is not larger than the standard range. When the stroke of the piston rod is longer than the standard range, the second valve device allows communication through the fourth passage. A second check valve allows the hydraulic fluid to flow through the first passage in only one direction from the oil tank to the pump chamber. A fifth passage provides communication between a portion of the first passage which is on the upstream side of the second check valve and a portion of the first passage which is on the downstream side of the second check valve. A restrictor device applies a resistance to the hydraulic fluid in the fifth passage according to the flow velocity of the hydraulic fluid such that when the flow velocity is high, a high resistance is applied to the hydraulic fluid. A switching valve device selectively switches between a first position where the hydraulic fluid is allowed to flow through the second passage in only one direction from the pump chamber to the accumulator tank and a second position where the hydraulic fluid is allowed to flow through the second passage bidirectionally.

By virtue of the above-described arrangement, the switching valve device is normally placed in the first position. When the extension position of the piston rod is within the standard range, the third and fourth passages are closed by the first and second valve devices, and thus no hydraulic fluid is supplied from the pump chamber to the cylinder nor discharged from the cylinder. Therefore, the extension position of the piston rod is maintained. At this time, as the piston rod extends and contracts, the volumetric capacity of the pump chamber increases and decreases, causing the hydraulic fluid in the oil tank to pass through the first passage and open the second check valve. Thus, the hydraulic fluid is introduced into the pump chamber and pressurized therein, and the pressurized hydraulic fluid is sent to the oil tank and the accumulator tank through the fifth and second passages. When the flow velocity of the hydraulic fluid in the fifth passage is high, the resistance applied by the restrictor device is high, and the amount of hydraulic fluid supplied to the accumulator tank increases.

When the extension of the piston rod is shorter than the standard range, the first valve device allows communication through the third passage. Therefore, the hydraulic fluid pressurized in the pump chamber passes through the third passage and opens the first check valve. Thus, the pressurized hydraulic fluid is supplied into the cylinder to extend the piston rod.

When the extension of the piston rod is longer than the standard range, the second valve device allows communication through the fourth passage. Therefore, the hydraulic fluid in the cylinder passes through the pump chamber and the fifth passage and flows through the restrictor device at a low flow velocity to return to the oil tank. Thus, the piston rod is contracted.

When the extension of the piston rod is shorter than the standard range, if the switching valve device is switched to the second position, the hydraulic fluid accumulated in the accumulator tank flows into the pump chamber through the second passage. Then, the hydraulic fluid is supplied from the pump chamber into the cylinder through the third passage to extend the piston rod.

DETAILED DESCRIPTION OF THE INVENTION

A first embodiment of the present invention will be described below in detail with reference to FIGS. 1 and 2.

Figure 1:
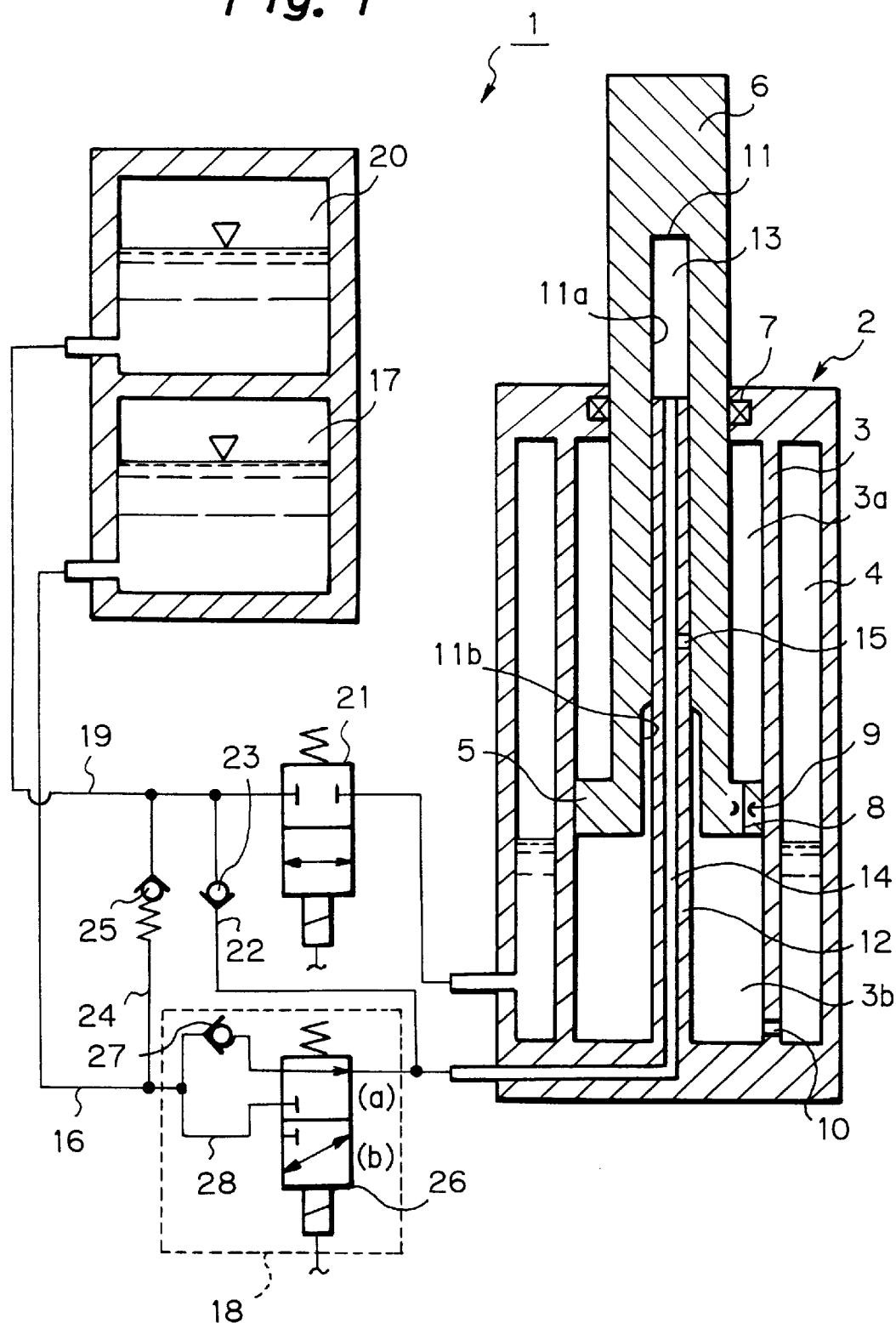
FIG. 1 is a schematic view showing a cylinder system according to a first embodiment of the present invention.
Figure 2:
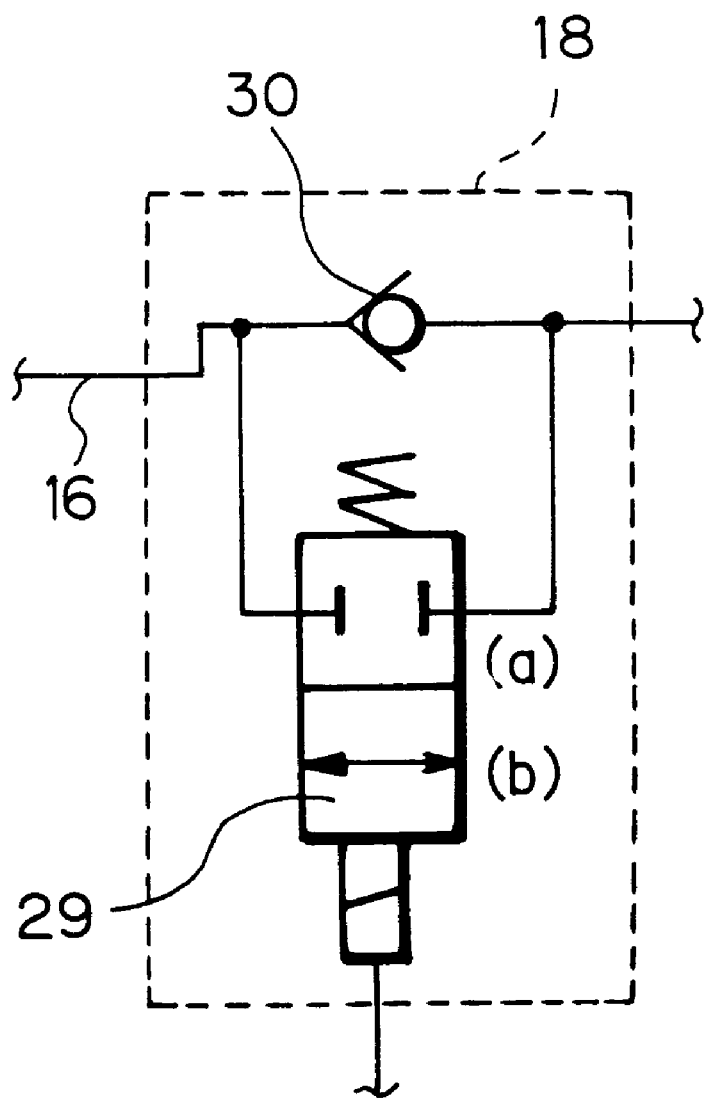
FIG. 2 is a circuit diagram showing a modification of a switching valve mechanism used in the system shown in FIG. 1.

As shown in FIG. 1, a cylinder system 1 according to this embodiment has a cylinder body 2. A cylinder 3 is provided in the cylinder body 2. An annular reservoir 4 is formed around the cylinder 3. A piston 5 is slidably fitted in the cylinder 3. The piston 5 divides the inside of the cylinder 3 into two chambers, i.e. a cylinder upper chamber 3a and a cylinder lower chamber 3b. One end of a hollow piston rod 6 is connected to the piston 5. The other end portion of the piston rod 6 extends through a seal 7 fitted in the upper end portion of the cylinder 3 and projects to the outside of the cylinder 3. The cylinder 3 has a hydraulic fluid sealed therein. In the reservoir 4, the hydraulic fluid and a gas are sealed.

The piston 5 is provided with a fluid passage 8 for providing communication between the cylinder upper and lower chambers 3a and 3b. The piston 5 is further provided with a damping force generating mechanism 9 (damping force generating device) which includes an orifice or a disk valve device, for example. The damping force generating mechanism 9 generates damping force by controlling the flow of the hydraulic fluid flowing through the fluid passage 8. The cylinder lower chamber 3b and the reservoir 4 are communicated with each other under an appropriate flow resistance through a fluid passage 10 which is provided in the lower end portion of the cylinder 3. Thus, the pressure in the cylinder lower chamber 3b and that in the reservoir 4 are propagated mutually through the fluid passage 10.

A stepped hollow portion 11 is formed in the piston rod 6. The hollow portion 11 has a small-diameter portion 11a and a large-diameter portion 11b. The large-diameter portion 11b extends through the piston 5 to communicate with the cylinder lower chamber 3b. A tubular pump rod 12 is provided in the cylinder 3 to extend along the center axis of the cylinder 3. The proximal end of the pump rod 12 is connected to the bottom of the cylinder 3. The distal end portion of the pump rod 12 extends through the large-diameter portion 11b of the hollow portion 11 and is slidably fitted in the small-diameter portion 11a. The distal end of the pump rod 12 forms a pump chamber 13 (pump device) in the small-diameter portion 11a. A fluid passage 14 provided in the pump rod 12 is communicated with the pump chamber 13. The side wall of the pump rod 12 is provided with an orifice port 15 (second switching valve) which communicates with the fluid passage 14.

An oil tank 17 for storing the hydraulic fluid is connected to the fluid passage 14 in the pump rod 12 through a line 16

(second passage). The line 16 is provided with a switching valve mechanism 18. An accumulator tank 20 is connected to the reservoir 4 through a line 19 (first passage). The line 19 is provided with a switching valve 21 (first switching valve). A portion of the line 16 on a side of the switching valve mechanism 18 which is closer to the fluid passage 14 is connected through a line 22 to a portion of the line 19 on a side of the switching valve 21 which is closer to the accumulator tank 20. The line 22 is provided with a check valve 23 (pump device) which allows the hydraulic fluid to flow through the line 22 in only one direction from the line 16 to the line 19. A portion of the line 16 on a side of the switching valve mechanism 18 which is closer to the oil tank 17 is connected through a line 24 to a portion of the line 19 on a side of its joint with the line 22 which is closer to the accumulator tank 20. The line 24 is provided with a relief valve 25 which opens when the pressure of the hydraulic fluid in the accumulator tank 20 reaches a predetermined pressure to allow the pressure fluid in the accumulator tank 20 to escape to the oil tank 17.

The inside of the oil tank 17 is divided by a free piston or a diaphragm into an oil chamber for storing the hydraulic fluid and a gas chamber having a low-pressure gas sealed therein (e.g. a gas of 20 kg/cm$^2$ in a state where the greater part of the oil tank 17 is filled with the hydraulic fluid). The inside of the accumulator tank 20 is divided by a free piston or a diaphragm into an oil chamber for storing the hydraulic fluid and a gas chamber having a high-pressure gas sealed therein (e.g. a gas of 60 kg/cm$^2$ in a state where substantially no hydraulic fluid remains in the accumulator tank 20). In each of the oil and accumulator tanks 17 and 20, the pressure of the hydraulic fluid in the oil chamber can be accumulated by the compression and expansion of the gas in the gas chamber.

The switching valve mechanism 18 is formed from a combination of a three-port, two-position solenoid-operated switching valve 26 (second switching valve), a check valve 27 (pump device), and a line 28. Normally, the switching valve 26 is placed in position (a). In this state, the line 16 is communicated with the fluid passage 14 through the check valve 27, thereby allowing the hydraulic fluid to flow through the line 16 in only one direction from the oil tank 17 to the fluid passage 14. When energized, the switching valve 26 is switched to position (b). Consequently, the line 16 is communicated with the fluid passage 14 through the line 28, thereby allowing the hydraulic fluid to flow through the line 16 bidirectionally. The switching valve 21 is a solenoid-operated on-off valve. Normally, the switching valve 21 cuts off the line 19. When energized, the switching valve 21 allows communication through the line 19.

The cylinder system 1, together with a vehicle height sensor (not shown; vehicle height detecting device) for detecting the vehicle height, is installed between the body and an axle of a vehicle (not shown). A controller (not shown) is connected to the vehicle height sensor and the switching valves 21 and 26 of the cylinder system 1 to form a vehicle height adjusting apparatus. When the vehicle height detected by the vehicle height sensor is within a predetermined standard vehicle height range, the controller sets the switching valve 26 to position (a) and closes the switching valve 21. When the detected vehicle height is lower than the standard vehicle height range, the controller sets the switching valve 26 to position (a) and opens the switching valve 21. When the vehicle height detected by the sensor is higher than the standard vehicle height range, the controller sets the switching valve 26 to position (b) and closes the switching valve 21. It should be noted that the orifice port 15 of the pump rod 12 is disposed such that when the detected vehicle height is lower than the standard vehicle height range, the orifice port 15 is closed by the small-diameter portion 11a of the hollow portion 11, whereas, when the vehicle height exceeds the standard vehicle height range, the orifice port 15 communicates with the large-diameter portion 11b.

The operation of this embodiment, arranged as stated above, will be described below.

In the cylinder system 1, when the piston 5 moves in association with a stroke of the piston rod 6, the hydraulic fluid flows between the cylinder upper and lower chambers 3a and 3b through the fluid passage 8, causing a damping force to be generated by the damping force generating mechanism 9. At this time, a change in the volumetric capacity in the cylinder 3, which corresponds to the amount by which the piston rod 6 enters or withdraws from the cylinder 3 during the stroke thereof, is compensated for by compression or expansion of the gas in the reservoir 4.

Next, the vehicle height adjusting apparatus having the cylinder system 1 will be explained. When the vehicle height of the vehicle equipped with the vehicle height adjusting apparatus is within the standard vehicle height range, the controller sets the switching valve 26 to position (a) and closes the switching valve 21 on the basis of the vehicle height detected by the vehicle height sensor. At this time, the orifice port 15 of the pump rod 12 is closed by the small-diameter portion 11a of the hollow portion 11. In this state, the cylinder 3 and the reservoir 4 are cut off from the pump chamber 13, the oil tank 17 and the accumulator tank 20. Therefore, the vehicle height is maintained.

When the piston rod 6 extends in response to a vibration of the suspension system during running of the vehicle, the volumetric capacity in the pump chamber 13 increases, and the pressure in the pump chamber 13 lowers. Consequently, the check valve 23 is closed, whereas the check valve 27 opens. Thus, the oil tank-side hydraulic fluid is introduced into the pump chamber 13 through the line 16 and the fluid passage 14. When the piston rod 6 contracts, the volumetric capacity in the pump chamber 13 reduces, and the pressure in the pump chamber 13 rises. Consequently, the check valve 23 opens, whereas the check valve 27 is closed. Thus, the pump chamber-side hydraulic fluid is pressurized and supplied into the accumulator tank 20 through the fluid passage 14 and the line 22. Accordingly, in response to the repeated extension and contraction of the piston rod 6, the hydraulic fluid is supplied from the oil tank 17 to the accumulator tank 20, and thus the pressurized hydraulic fluid is accumulated in the accumulator tank 20. When the greater part of the hydraulic fluid in the oil chamber of the oil tank 17 has been sent into the oil chamber of the accumulator tank 20, for example, the pressure in the accumulator tank 20 is 120 kg/cm$^2$, and the pressure in the oil tank 17 is 5 kg/cm$^2$. In this case, the pressure in the cylinder 3 is held constant at 20 kg/cm$^2$. Thereafter, when the hydraulic fluid accumulated in the accumulator tank 20 reaches a predetermined pressure, the relief valve 25 opens, and the accumulator tank-side hydraulic fluid is returned to the oil tank 17.

When the vehicle height becomes lower than the standard vehicle height range as a result of an increase in the carrying load, the controller sets the switching valve 26 to position (a) and opens the switching valve 21 on the basis of the vehicle height detected by the vehicle height sensor. At this time, the orifice port 15 of the pump rod 12 is still closed by the small-diameter portion 11a of the hollow portion 11. In this state, the hydraulic fluid in the accumulator tank 20 is supplied to the reservoir 4 through the line 19. Consequently, the hydraulic fluid in the reservoir 4 and the cylinder 3 is pressurized, causing the vehicle height to rise. At this time, for example, the pressure in the accumulator tank 20 is 60 kg/cm$^2$, and the pressure in the cylinder 3 is 50 kg/cm$^2$. When the vehicle height reaches a level within the standard vehicle height range, the controller closes the switching valve 21 to cut off the reservoir 4 from the accumulator tank 20, thereby maintaining the vehicle height. It should be noted that when the vehicle height is also lower than the standard vehicle height range, the hydraulic fluid is supplied from the oil tank 17 to the accumulator tank 20 and accumulated therein by the extension and contraction of the piston rod 6 as in the case of the above.

When the vehicle height becomes higher than the standard vehicle height range as a result of a reduction in the carrying load, the controller sets the switching valve 26 to position (b) and closes the switching valve 21 on the basis of the vehicle height detected by the vehicle height sensor. At this time, the orifice port 15 of the pump rod 12 communicates with the large-diameter portion 11b of the hollow portion 11, thereby allowing the fluid passage 14 to be communicated with the cylinder lower chamber 3b. In this state, the line 16 is communicated with the fluid passage 14 through the line 28 to allow the hydraulic fluid to flow bidirectionally. Therefore, the hydraulic fluid is discharged out of the cylinder 3 and the reservoir 4 to the oil tank 17 through the orifice port 15, the fluid passage 14 and the line 16. Consequently, the pressure in the cylinder 3 and the reservoir 4 is reduced, and thus the vehicle height lowers. When the vehicle height lowers to a level within the standard vehicle height range, the controller sets the switching valve 26 to position (a), and the reservoir 4 is cut off from the accumulator tank 20, thereby maintaining the vehicle height. It should be noted that when the vehicle height is higher than the standard vehicle height range, the pump chamber 13 is constantly communicated with the oil tank 17; therefore, accumulation of the pressurized hydraulic fluid in the accumulator tank 20 is not carried out.

In this way, the pressurized hydraulic fluid can be supplied to the accumulator tank 20 and accumulated therein by using the vibrations of the suspension system during running. Moreover, the controller appropriately switches the switching valves 21 and 26 on the basis of the vehicle height detected by the vehicle height sensor to supply the hydraulic fluid from the accumulator tank 20 to the cylinder 3 and the reservoir 4 and to discharge the hydraulic fluid from the cylinder 3 and the reservoir 4 to the oil tank 17, thereby enabling the vehicle height to be adjusted within a predetermined standard vehicle height range at all times irrespective of the carrying load.

Because the vehicle height is adjusted by supplying or discharging the hydraulic fluid to or from the cylinder 3 and the reservoir 4 through the switching valves 21 and 26, vehicle height adjustment can be made before starting running. Accordingly, the vehicle height can be adjusted to a level within the standard vehicle height range even immediately after the vehicle in unloaded condition has been loaded with baggage, for example. Therefore, the road clearance can be ensured from the start of running, and the suspension system can be surely prevented from touching the ground.

It should be noted that the structure of the switching valve mechanism 18 according to this embodiment is not necessarily limited to that shown in FIG. 1, but any switching valve mechanism can be used as long as it is possible to selectively switch between a position where the hydraulic fluid is allowed to flow through the line 16 in only one direction from the oil tank 17 to the fluid passage 14 and a position where the hydraulic fluid is allowed to flow through the line 16 bidirectionally. For example, as shown in FIG. 2, the switching valve mechanism 18 may be formed from a combination of a solenoid-operated on-off valve 29 and a check valve 30. In such a case, the same action and effect as those of the switching valve mechanism 18 shown in FIG. 1 can be obtained by switching the on-off valve 29 between position (a) (closed position) and position (b) (open position) as in the case of the switching valve 26 shown in FIG. 1.

Although in this embodiment the vehicle height is automatically adjusted to a level within the standard vehicle height range by appropriately switching the switching valves 21 and 26 on the basis of the detected vehicle height using the vehicle height sensor and the controller, the vehicle height may be adjusted by switching the switching valves 21 and 26 using a hand-operated switch in place of the vehicle height sensor. Further, although in this embodiment the relief valve 25 is provided in the line 24, which connects the lines 16 and 19, it is also possible to provide a similar relief valve in the partition wall between the oil tank 17 and the accumulator tank 20.

Next, a second embodiment of the present invention will be described in detail with reference to FIGS. 3 to 5.

Figure 3:
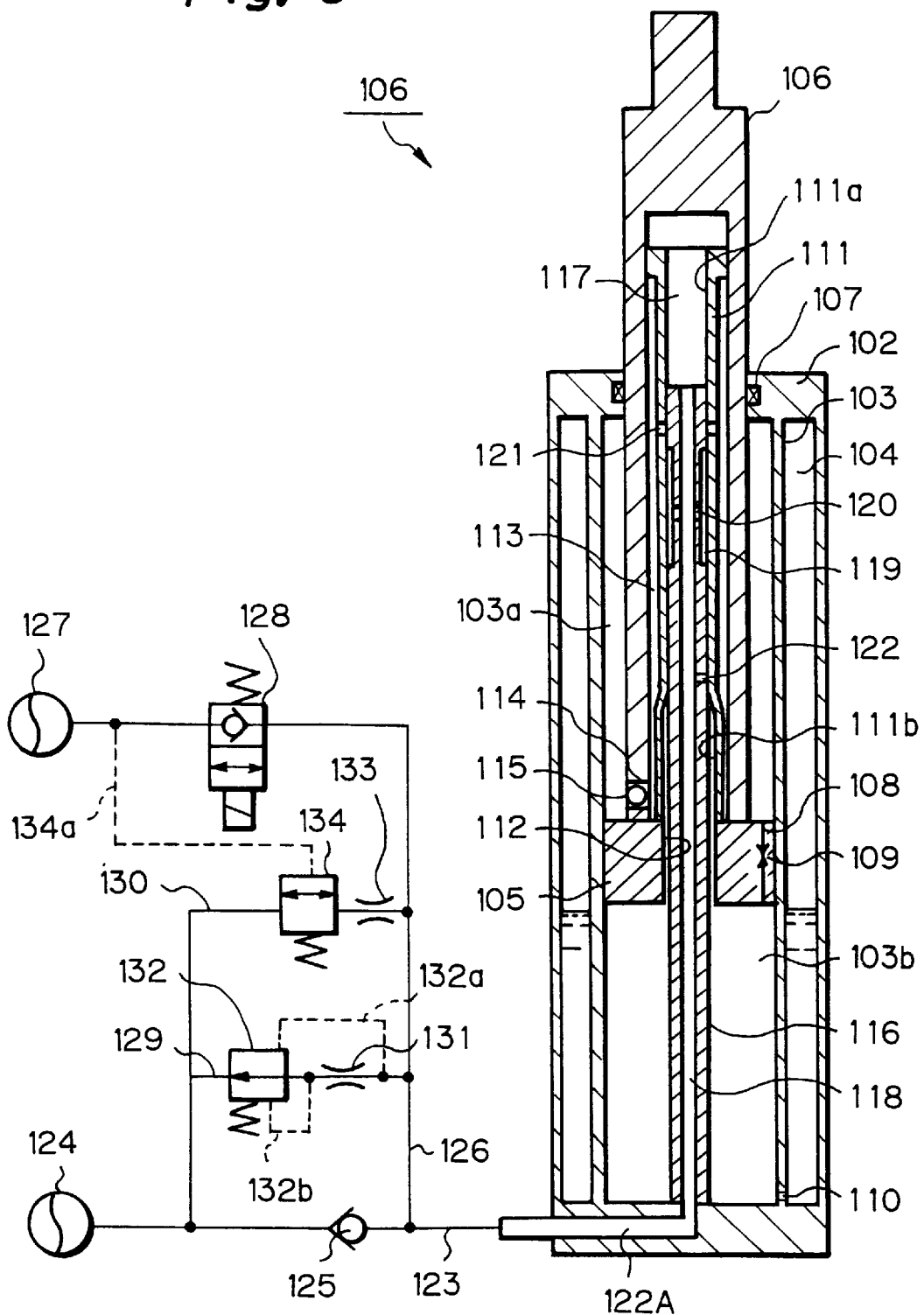
FIG. 3 is a schematic view showing a cylinder system according to a second embodiment of the present invention.

As shown in FIG. 3, a cylinder system 101 according to this embodiment has a cylinder body 102. A cylinder 103 is provided in the cylinder body 102. An annular reservoir 104 is formed around the cylinder 103. A piston 105 is slidably fitted in the cylinder 103. The piston 105 divides the inside of the cylinder 103 into two chambers, i.e. a cylinder upper chamber 103a and a cylinder lower chamber 103b. One end of a hollow piston rod 106 is connected to the piston 105. The other end portion of the piston rod 106 extends through a seal 107 fitted in the upper end portion of the cylinder 103 and projects to the outside of the cylinder 103. The cylinder 103 has a hydraulic fluid sealed therein. In the reservoir 104, the hydraulic fluid and a gas are sealed.

The piston 105 is provided with a fluid passage 108 for providing communication between the cylinder upper and lower chambers 103a and 103b. The piston 105 is further provided with a damping force generating mechanism 109 which includes an orifice or a disk valve device, for example. The damping force generating mechanism 109 generates damping force by controlling the flow of the hydraulic fluid flowing through the fluid passage 108. The cylinder lower chamber 103b and the reservoir 104 are communicated with each other under an appropriate flow resistance through a fluid passage 110 which is provided in the lower end portion of the cylinder 103. Thus, the pressure in the cylinder lower chamber 103b and that in the reservoir 104 are propagated mutually through the fluid passage 110.

A stepped pump tube 111 is inserted into and secured to the inside of the hollow piston rod 106. The pump tube 111 has a small-diameter portion 111a and a large-diameter portion 111b. The inside of the pump tube 111 is communicated with the cylinder lower chamber 103b through an opening 112 provided in the piston 105. An annular fluid passage 113 is formed between the piston rod 106 and the pump tube 111. The annular fluid passage 113 is communicated with the cylinder upper chamber 103a by a fluid passage 114 provided in the side wall of the piston rod 106. The fluid passage 114 is provided with a check valve 115 (first check valve) which allows the hydraulic fluid to flow in only one direction from the annular fluid passage 113 to the cylinder upper chamber 103a.

A tubular pump rod 116 is provided in the cylinder 103 to extend along the center axis of the cylinder 103. The proximal end of the pump rod 116 is connected to the bottom of the cylinder 103. The distal end portion of the pump rod 116 extends through the opening 112 of the piston 105 and is slidably fitted in the small-diameter portion 111a of the pump tube 111. The distal end of the pump rod 116 forms a pump chamber 117 in the small-diameter portion 111a of the pump tube 111. The pump chamber 117 is communicated with a fluid passage 118 provided in the pump rod 116.

A groove 119 is axially formed in the outer surface of the side wall of the pump rod 116. The groove 119 is communicated with the fluid passage 118 in the pump rod 116 through a fluid hole 120. The side wall of the small-diameter portion 111a of the pump tube 111 is provided with a port 121 which communicates with the annular fluid passage 113 at a position which faces the distal end portion of the pump rod 116. The side wall of the pump rod 116 is provided with an orifice port 122 which is opened and closed by the small-diameter portion 111a and the large-diameter portion 111b of the pump tube 111.

Thus, a third passage is formed by the annular fluid passage 113, the fluid passage 114, the fluid hole 120 and the fluid passage 118, and a first valve device is formed by the groove 119 and the port 121. Further, a fourth passage is formed by the fluid passage 118, the large-diameter portion 111b and the opening 112, and a second valve device is formed by the orifice port 122 and the small-diameter portion 111a.

It should be noted that FIG. 3 shows the cylinder system in a state where the extension of the piston rod 106 is within a predetermined standard range corresponding to a standard vehicle height of the vehicle equipped with the cylinder system. In this state, the first and second valve devices cut off the third and fourth passages, respectively.

The axial dimension and position of the groove 119 of the pump rod 116 are set such that when the extension of the piston rod 106 is not shorter than the predetermined standard range corresponding to the standard vehicle height of the vehicle (see FIG. 4), the groove 119 is cut off from the port 121 of the pump tube 111, whereas, when the extension of the piston rod 106 is shorter than the standard range, the groove 119 is communicated with the port 121. The orifice port 122 of the pump rod 116 is disposed such that when the extension of the piston rod 106 is not longer than the standard range (see FIG. 5), the orifice port 122 is closed by the small-diameter portion 111a of the pump tube 111, whereas, when the extension of the piston rod 106 is longer than the standard range, the orifice port 122 is communicated with the cylinder lower chamber 103b by the large-diameter portion 111b of the pump tube 111 and the opening 112 of the piston 105.

The fluid passage 118 of the pump rod 116 is communicated with a fluid passage 122A provided in the bottom of the cylinder 103. The fluid passage 122A is connected to an oil tank 124 by a line 123. Thus, a first passage is formed by the fluid passage 118, the fluid passage 122A and the line 123. The line 123 is provided with a check valve 125 (second check valve) which allows the hydraulic fluid to flow through the line 123 in only one direction from the oil tank 124 to the fluid passage 122A. The inside of the oil tank 124 is divided by a free piston or a diaphragm into an oil chamber for storing the hydraulic fluid and a gas chamber having a low-pressure gas sealed therein. The oil tank 124 can store a necessary amount of hydraulic fluid by the compression and expansion of the low-pressure gas.

Further, an accumulator tank 127 is connected to the fluid passage 122A by a line 126 branched from a portion of the line 123 between the fluid passage 122A and the check valve 125. Thus, a second passage is formed by the fluid passages 118 and 122A and the line 126. The line 126 is provided with a solenoid-operated on-off valve 128 (switching valve device). The inside of the accumulator tank 127 is divided by a free piston or a diaphragm into an oil chamber for storing the hydraulic fluid and a gas chamber having a high-pressure gas sealed therein. The accumulator tank 127 can accumulate a necessary amount of hydraulic fluid by the compression and expansion of the high-pressure gas.

The initial pressure of the high-pressure gas in the accumulator tank 127 is set sufficiently higher than the pressure in the cylinder 103 and the reservoir 104 when the vehicle is fully laden. The solenoid-operated on-off valve 128 is a pilot-operated check valve. When not energized, the solenoid-operated on-off valve 128 acts as a check valve which allows the hydraulic fluid to flow through the line 126 in only one direction from the fluid passage 122A to the accumulator tank 127 (first position). When energized, the solenoid-operated on-off valve 128 allows the hydraulic fluid to flow through the line 126 bidirectionally (second position).

A portion of the line 126 between its joint with the line 123 and the solenoid-operated on-off valve 128 and a position of the line 123 between the check valve 125 and the oil tank 124, i.e. the upstream and downstream sides of the check valve 125, are communicated with each other by a line 129 (fifth passage) and a line 130. The line 129 is provided with a restrictor 131 and a pressure control valve 132 (restrictor device). The line 130 is provided with a restrictor 133 and an unload valve 134. The pressure control valve 132 is normally open and introduces thereto the pressures on the upstream and downstream sides of the restrictor 131 through respective pilot passages 132a and 132b. The pressure control valve 132 is closed when the difference between the introduced pressures reaches a predetermined value. The unload valve 134 is normally closed. The pressure of the hydraulic fluid accumulated in the accumulator tank 127 is introduced into the unload valve 134 through a pilot passage 134a. The unload valve 134 opens when the pressure of the hydraulic fluid in the accumulator tank 127 reaches a predetermined value.

The cylinder system 101 is interposed between a wheel-side member and a vehicle body-side member of a suspension system (not shown) of a vehicle. A power supply (not shown) and a switch (not shown) are connected to the solenoid-operated on-off valve 128.

The operation of this embodiment, arranged as stated above, will be described below.

In the cylinder system 101, when the piston 105 moves in association with a stroke of the piston rod 106, the hydraulic fluid flows between the cylinder upper and lower chambers 103a and 103b through the fluid passage 108, causing damping force to be generated by the damping force generating mechanism 109. At this time, a change in the volumetric capacity in the cylinder 103, which corresponds to the amount by which the piston rod 106 enters or withdraws from the cylinder 103 during the stroke thereof, is compensated for by compression or expansion of the gas in the reservoir 104.

Next, the vehicle height adjusting function of the cylinder system 101 will be explained.

When the vehicle height of the vehicle equipped with the cylinder system 101 is at the standard level, as shown in FIG. 3, the port 121 of the pump tube 111 is at a position higher than the groove 119 of the pump rod 116. Therefore, the port 121 is closed by the side wall of the pump rod 116. The orifice port 122 of the pump rod 116 is closed by the small-diameter portion 111a of the pump tube 111. Accordingly, the cylinder upper and lower chambers 103a and 103b and the reservoir 104 are cut off from the pump chamber 117; neither supply nor discharge of the hydraulic fluid is performed. Thus, the current extension position of the piston rod 106, that is, the current vehicle height, is maintained.

In this state, if the piston rod 106 extends in response to a vibration of the suspension system during running of the vehicle, the volumetric capacity in the pump chamber 117 increases, and the pressure in the pump chamber 117 lowers. Consequently, the check valve 125 opens to allow the hydraulic fluid from the oil tank 124 to be introduced into the pump chamber 117 through the line 123 and the fluid passages 122A and 118. When the piston rod 106 retracts, the volumetric capacity in the pump chamber 117 reduces, and the pressure in the pump chamber 117 rises. Consequently, the check valve 125 is closed, and thus the hydraulic fluid in the pump chamber 117 is pressurized and supplied to the accumulator tank 127, passing through the fluid passages 118 and 122A and the line 126 while opening the check valve of the solenoid-operated on-off valve 128 (normally placed in a non-energized state). A part of the hydraulic fluid is returned to the oil tank 124 through the restrictor 131 and the pressure control valve 132, which are provided in the line 129.

The amount of hydraulic fluid supplied to the accumulator tank 127 through the pressure control valve 128 and the amount of hydraulic fluid returned to the oil tank 124 through the pressure control valve 132 are related to the flow velocity of the hydraulic fluid in the line 129. When the piston speed is low, the flow velocity of the hydraulic fluid is low, and the pressure loss produced by passing through the restrictor 131 is also small. Therefore, the differential pressure between the pilot passages 132a and 132b is small, and the pressure control valve 132 is open. Accordingly, the amount of hydraulic fluid returned to the oil tank 124 is large. When the piston speed is high, the flow velocity of the hydraulic fluid is high, and the pressure loss produced by passing through the restrictor 131 is also large. Therefore, the differential pressure between the pilot passages 132a and 132b is large, and the pressure control valve 132 is closed. Accordingly, the amount of hydraulic fluid returned to the oil tank 124 is small.

The piston speed caused by vibrations of the suspension system during running is sufficiently high. Therefore, most of the hydraulic fluid pressurized in the pump chamber 117 by pumping during running is supplied to the accumulator tank 127. Thus, a high-pressure hydraulic fluid can be accumulated in the accumulator tank 127.

When the pressure of the hydraulic fluid accumulated in the accumulator tank 127 exceeds a set value, the unload valve 134 is opened by the pilot pressure introduced from the pilot passage 134a. Consequently, the hydraulic fluid pressurized in the pump chamber 117 is returned to the oil tank 124 through the line 130. Thus, when the pressure in the accumulator tank 127 reaches a predetermined value, the pumping operation is canceled. Therefore, it is possible to prevent the reaction force of the piston rod 106 from increasing as a result of excessive pumping and hence possible to avoid degradation of the ride quality.

Figure 5:
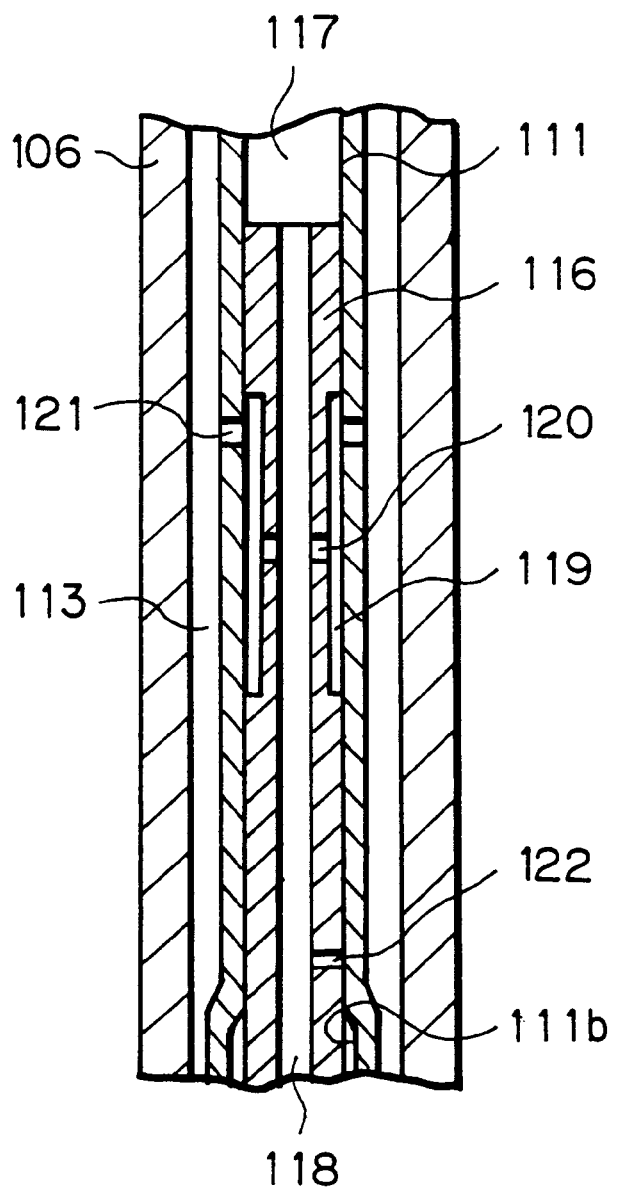
FIG. 5 is an enlarged view showing the pump rod portion of the system shown in FIG. 3 (in a state where the vehicle height is lower than the standard vehicle height).

When the vehicle height becomes lower than the standard vehicle height as a result of an increase in the carrying load, as shown in FIG. 5, the port 121 of the pump tube 111 becomes communicated with the groove 119 of the pump rod 116, and thus the pump chamber 117 is communicated with the cylinder upper and lower chambers 103a and 103b and the reservoir 104 through the check valve 115 by the annular fluid passage 113 and the fluid passage 114. Consequently, the hydraulic fluid pressurized in the pump chamber 117 opens the check valve 115 and is supplied to the cylinder upper and lower chambers 103a and 103b and the reservoir 104, causing the piston rod 106 to extend and thereby raising the vehicle height. At this time, because the initial pressure in the accumulator tank 127 has been set sufficiently higher than the pressure in the cylinder 103 and the reservoir 104 when the vehicle is fully laden, the hydraulic fluid pressurized in the pump chamber 117 is not supplied to the accumulator tank 127. When the vehicle height reaches a level within the standard vehicle height range, the port 121 of the pump tube 111 is closed to stop the supply of the hydraulic fluid to the cylinder upper and lower chambers 103a and 103b and the reservoir 104. Thus, the vehicle height is maintained.

More specifically, the hydraulic fluid pressurized in the pump chamber 117 is first supplied to the cylinder upper and lower chambers 103a and 103b and the reservoir 104, and after the vehicle height has reached the standard vehicle height, the hydraulic fluid is supplied to the accumulator tank 127.

Figure 4:
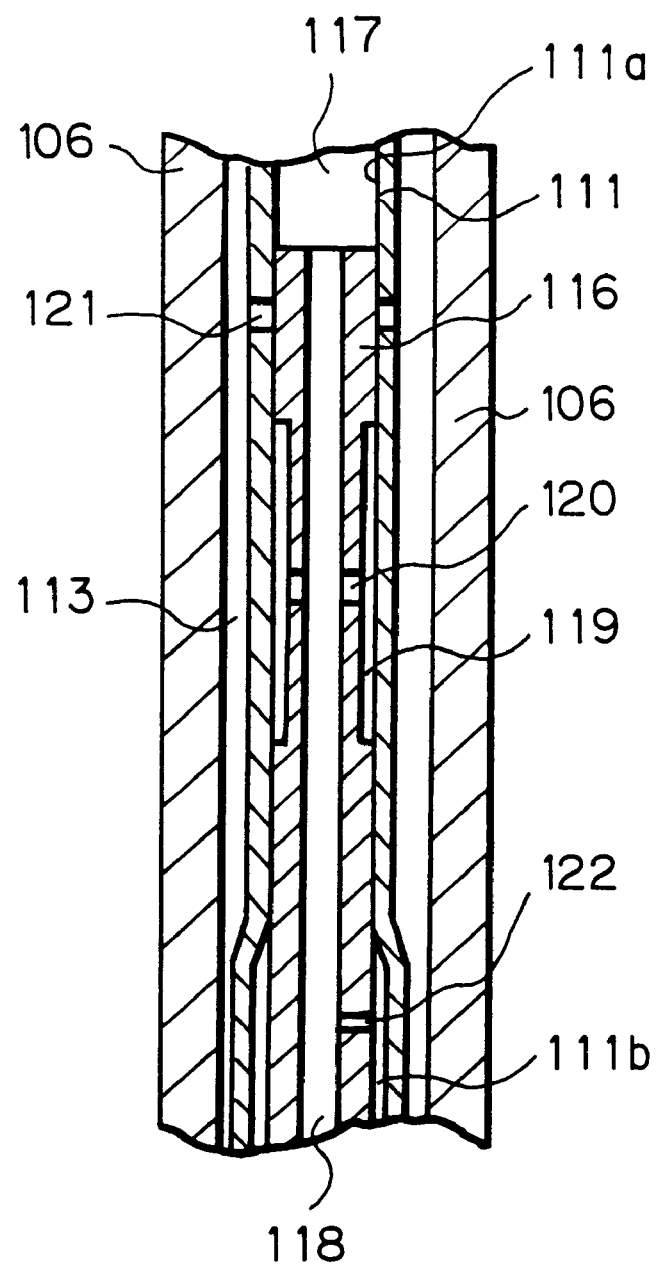
FIG. 4 is an enlarged view showing a pump rod portion of the system shown in FIG. 3 (in a state where the vehicle height is higher than a standard vehicle height).

When the vehicle height becomes higher than the standard vehicle height as a result of a reduction in the carrying load due to the fact that the occupant gets off the vehicle or baggage is unloaded therefrom, as shown in FIG. 4, the orifice port 122 of the pump rod 116 is communicated with the large-diameter portion 111b of the pump tube 111 and hence communicated with the cylinder upper and lower chambers 103a and 103b and the reservoir 104 through the opening 112 of the piston 105. Consequently, the hydraulic fluid in the cylinder upper and lower chambers 103a and 103b and the reservoir 104 is returned to the oil tank 124 through the opening 112, the large-diameter portion 111b, the orifice port 122, the fluid passages 118 and 122A and the lines 123 and 129 via the restrictor 131 and the pressure control valve 132. At this time, the vehicle is at a stop, and the flow velocity of the hydraulic fluid in the line 129 that is caused by the lowering of the vehicle height is sufficiently low. Therefore, the pressure loss produced by the restrictor 131 is small, and the differential pressure between the pilot passages 132a and 132b is small. Consequently, the pressure control valve 132 opens, and the hydraulic fluid is smoothly returned to the oil tank 124. When the vehicle height lowers to a level within the standard vehicle height range, the orifice port 122 is closed by the small-diameter portion 111a of the pump tube 111. Thus, the return of the hydraulic fluid to the oil tank 124 is stopped, and the vehicle height is maintained.

In this way, the extension position of the piston rod 106 is adjusted by pumping using vibrations of the suspension system during running, thereby enabling the vehicle height to be adjusted to a constant level irrespective of the carrying load. At the same time, a necessary amount of pressure fluid can be accumulated in the accumulator tank 127.

Moreover, when the vehicle height is lower than the standard vehicle height as a result of loading baggage onto the vehicle in unloaded condition, for example, if the solenoid-operated on-off valve 128 is opened by actuating the switch before starting running, the high-pressure hydraulic fluid accumulated in the accumulator tank 127 is supplied to the cylinder upper and lower chambers 103a and 103b and the reservoir 104 through the line 126, the fluid passages 122A and 118, the pump chamber 117, the port 120, the groove 119, the port 121, the annular fluid passage 113 and the fluid passage 114, causing the pump rod 116 to extend. Thus, the vehicle height can be raised. When the vehicle height reaches a level within the standard vehicle height range, the port 121 of the pump tube 111 is closed to stop the supply of the hydraulic fluid to the cylinder upper and lower chambers 103a and 103b and the reservoir 104. Thus, the vehicle height is maintained. Thereafter, the solenoid-operated on-off valve 128 is closed by actuating the switch.

Accordingly, the vehicle height can be adjusted to a level within the standard vehicle height range even immediately after the vehicle in unloaded condition has been loaded with baggage. Therefore, the road clearance can be ensured from the start of running, and the suspension system can be surely prevented from touching the ground. When the vehicle height reaches a level within the standard vehicle height range, the supply of the hydraulic fluid to the cylinder upper and lower chambers 103a and 103b and the reservoir 104 is mechanically stopped by the combination of the pump tube 111 and the pump rod 116. Therefore, it is unnecessary to provide a vehicle height sensor or the like separately. Thus, the production cost can be reduced.

According to this embodiment, the cylinder system requires only one solenoid-operated on-off valve 128 (switching valve device) and hence needs no complicated control. In addition, the production cost can be reduced.

Although in the above-described embodiment the combination of the restrictor 131 and the pressure control valve 132 is used as a restrictor device in the fifth passage of the cylinder system according to the present invention, it should be noted that the restrictor device is not necessarily limited thereto. It is also possible to remove the pressure control valve and use only a restrictor, an orifice, etc. as long as the restrictor device can apply a high resistance to the hydraulic fluid in the fifth passage according to the flow velocity thereof when the flow velocity is high.

As has been detailed above, according to one aspect of the present invention, the pump device operates in response to the strokes of the piston rod caused by vibrations of the vehicle during running to supply the hydraulic fluid from the oil tank to the accumulator tank, thereby accumulating the pressurized hydraulic fluid in the accumulator tank. Further, the hydraulic fluid in the accumulator tank is supplied to the cylinder by opening the first switching valve, and the hydraulic fluid in the cylinder is returned to the oil tank by opening the second switching valve, thereby adjusting the pressure of the hydraulic fluid in the cylinder. Thus, the vehicle height can be adjusted. As a result, vehicle height adjustment can be made before starting running. Accordingly, the vehicle height can be adjusted to a level within the standard vehicle height range even immediately after the vehicle in unloaded condition has been loaded with baggage, for example. Therefore, the road clearance can be ensured from the start of running, and the suspension system can be surely prevented from touching the ground.

According to another aspect of the present invention, when the vehicle height is within the standard vehicle height range, the first and second switching valves are closed to cut off the cylinder from the oil tank and the accumulator tank, thereby maintaining the vehicle height. When the vehicle height is lower than the standard vehicle height, the first switching valve is opened to supply the hydraulic fluid from the accumulator tank to the cylinder, thereby raising the vehicle height. When the vehicle height is higher than the standard vehicle height, the second switching valve is opened to discharge the hydraulic fluid from the cylinder to the oil tank, thereby lowering the vehicle height. Therefore, the vehicle height can be adjusted within a predetermined standard vehicle height range at all times irrespective of the carrying load.

According to still another aspect of the present invention, the vehicle height is adjusted by utilizing the strokes of the piston rod caused by vibrations of the suspension system during running of the vehicle. In addition, a necessary amount of pressure fluid can be accumulated in the accumulator tank. Further, even before starting running, the vehicle height can be adjusted by supplying the hydraulic fluid accumulated in the accumulator tank to the cylinder by switching the switching valve to the second position. Therefore, the road clearance can be ensured from the start of running, and the suspension system can be surely prevented from touching the ground.

What is claimed is:

1. A cylinder system comprising:
   a cylinder having hydraulic fluid sealed therein;
   a piston slidably fitted in said cylinder;
   a piston rod connected at one end thereof to said piston, said piston rod extending at the other end thereof to outside of said cylinder;
   an oil tank for storing hydraulic fluid;
   an accumulator tank for accumulating pressurized hydraulic fluid;
   pump means for supplying the hydraulic fluid from said oil tank to said accumulator tank in response to strokes of said piston rod;
   a first passage which connects said cylinder and said accumulator tank;
   a first switching valve for selectively opening and closing said first passage;
   a second passage which connects said cylinder and said oil tank; and
   a second switching valve for selectively opening and closing said second passage.

2. A vehicle height adjusting apparatus comprising the cylinder system of claim 1 and:
   vehicle height detecting means for detecting a vehicle height, said cylinder system and said vehicle height detecting means being provided between a vehicle body and an axle,
   wherein when the vehicle height detected by said vehicle height detecting means is within a predetermined standard vehicle height range, said first switching valve and said second switching valve are closed, and when the vehicle height is lower than said standard vehicle height range, said first switching valve is opened and said second switching valve is closed to raise the vehicle height, whereas when the vehicle height is higher than said standard vehicle height range, said first switching valve is closed and said second switching valve is opened to lower the vehicle height.

3. A vehicle height adjusting apparatus according to claim 2,
   wherein said pump means comprises a hollow portion having a bottom in said piston rod and a pump rod which is fixed to said cylinder and extends in said hollow portion so that a pump chamber is formed between said bottom of said hollow portion and said pump rod, said pump rod having a fluid passage extending therethrough and forming a part of said second passage, and, wherein, said second passage has a check valve which allows a flow only from said oil tank to said pump chamber and a bypass line bypassing said check valve so that said second switching valve places said check valve in said second passage when it is closed and places said bypass line in said second passage when it is opened; and a connection line is provided to extend from a point in said second passage on a side of said check valve closer to said pump chamber to a point in said first passage on a side of said first switching valve closer to said accumulator tank, said connection line having a check valve which allows a flow only from said pump chamber to said accumulator tank.

4. A vehicle height adjusting apparatus according to claim 3, wherein said piston divides the interior of said cylinder into a cylinder upper chamber and a cylinder lower chamber and said hollow portion has a large-diameter portion opening to said cylinder lower chamber, said pump rod having an orifice port which communicates with said large-diameter portion when said piston rod extends beyond a predetermined standard vehicle height range.

5. A cylinder system according to claim 1, wherein said pump means comprises a hollow portion having a bottom in said piston rod and a pump rod which is fixed to said cylinder and extends in said hollow portion so that a pump chamber is formed between said bottom of said hollow portion and said pump rod, said pump rod having a fluid passage extending therethrough and forming a part of said second passage, and, wherein, said second passage has a check valve which allows a flow only from said oil tank to said pump chamber and a bypass line bypassing said check valve so that said second switching valve places said check valve in said second passage when it is closed and places said bypass line in said second passage when it is opened; and a connection line is provided to extend from a point in said second passage on a side of said check valve closer to said pump chamber to a point in said first passage on a side of said first switching valve closer to said accumulator tank, said connection line having a check valve which allows a flow only from said pump chamber to said accumulator tank.

6. A cylinder system according to claim 5, wherein said piston divides the interior of said cylinder into a cylinder upper chamber and a cylinder lower chamber and said hollow portion has a large-diameter portion opening to said cylinder lower chamber, said pump rod having an orifice port which communicates with said large-diameter portion when said piston rod extends beyond a predetermined standard vehicle height range.

7. A cylinder system comprising:

a cylinder having hydraulic fluid sealed therein;

a piston slidably fitted in said cylinder;

a piston rod connected at one end thereof to said piston, said piston rod extending at the other end thereof to outside of said cylinder;

an oil tank for storing hydraulic fluid;

an accumulator tank for accumulating pressurized hydraulic fluid;

a pump chamber whose volumetric capacity varies according to a stroke of said piston rod;

a first passage which connects said pump chamber and said oil tank;

a second passage which connects said pump chamber and said accumulator tank;

third and fourth passages which provide communication between said pump chamber and said cylinder;

a first check valve which allows hydraulic fluid to flow through said third passage in only one direction from said pump chamber to said cylinder;

first valve means for cutting off said third passage when the stroke of said piston rod is not shorter than a standard range and allowing communication through said third passage when the stroke of said piston rod is shorter than said standard range;

second valve means for cutting off said fourth passage when the stroke of said piston rod is not larger than the standard range and allowing communication through said fourth passage when the stroke of said piston rod is longer than said standard range;

a second check valve which allows the hydraulic fluid to flow through said first passage in only one direction from said oil tank to said pump chamber;

a fifth passage which provides communication between a portion of said first passage which is on an upstream side of said second check valve and a portion of said first passage which is on a downstream side of said second check valve;

restrictor means for applying a resistance to hydraulic fluid in said fifth passage according to a flow velocity of the hydraulic fluid such that when the flow velocity is high, a high resistance is applied to the hydraulic fluid; and switching valve means for selectively switching between a first position where the hydraulic fluid is allowed to flow through said second passage in only one direction from said pump chamber to said accumulator tank and a second position where the hydraulic fluid is allowed to flow through said second passage bidirectionally.

8. A cylinder system according to claim 7, wherein said piston rod has a hollow portion having a bottom portion and receiving a pump tube defining an annular passage therearound which does not communicate with said bottom portion; and said pump chamber is formed between said bottom portion and a pump rod which is fixed to said cylinder and extends in said pump tube, said pump rod having a fluid passage extending therethrough and forming a part of said first passage, and, wherein, said first valve means comprises a groove formed on the outer wall of said pump rod and a port formed in the wall of said pump tube.

9. A cylinder system according to claim 8, wherein said piston divides the interior of said cylinder into a cylinder upper chamber and a cylinder lower chamber and said pump tube has a large-diameter portion opening to said cylinder lower chamber, and wherein said second valve means comprises an orifice port formed in said pump rod which communicates with said large-diameter portion when the stroke of said piston rod is longer than said standard range.

10. A cylinder system according to claim 7, wherein said fifth passage further has a pressure control valve which is normally open and closed when the pressure difference across said restrictor means reaches a predetermined value.

* * * * *